Patented Dec. 21, 1943

2,337,051

UNITED STATES PATENT OFFICE 2,337,051

FATTY OIL MODIFIED-NAPHTHALENE-FORMALDEHYDE RESINS

Ernest B. Kester, Forest Hills, Pa., assignor to Koppers Company, Pittsburgh, Pa., a corporation of Delaware No Drawing. Application April 27, 1940, Serial No. 332,074

12 Claims. (Cl. 260—18)

This invention relates to plastic compositions and methods of preparing the same. More particularly the invention relates to resinous materials resulting from the reaction of a fatty material, particularly natural oils, fats and waxes, with a naphthalene formaldehyde condensation product.

Resins prepared by reacting naphthalene with formaldehyde are generally found to be incompatible with animal and vegetable oils, fats and waxes. At ordinary temperatures the solubility of the latter in such resins is relatively low. When a naphthalene resin is heated to solution temperature with, for instance, from ten to thirty per cent of an oil such as linseed oil, stratification of two phases results on cooling. In connection with the present invention it has been found that fatty acid compositions chemically react with naphthalene-aldehyde condensation products to form resins having properties that render it highly desirable for a wide range of uses. The reaction occurs at a temperature substantially above the initial temperature at which the naphthalene condensation products dissolve completely in fatty acid compositions. In the above instance, when the linseed oil and the naphthalene resin are heated together to a temperature within substantially the range 325° C. to 350° C. and this temperature is maintained for a relatively short period, the oil and resin chemically react to form a resin product that remains transparent on cooling to room temperature. Complete reaction can be determined by spotting drops of the hot reaction product on a cold surface or by forming pills thereof. If a spot or pill remains transparent this is an indication that the reaction is completed. If the two reactants, the oil and the resin are treated independently of each other in exactly the manner described, then cooled and remelted in the presence of each other at a temperature just sufficient to produce liquefaction and solution, separation will again take place when the melt has cooled. This behavior is cited to show that chemical reaction takes place between the resin and the oil when treated in accordance with the hereindescribed method.

The resin of the present invention is prepared by heating a mixture comprising a fatty acid composition and a resin prepared from naphthalene and aldehyde until the fatty acid composition and the resin have completely reacted or substantially so with each other. The temperature to which the mixture is heated is preferably below about 400° C. and may be as low as about 200° C. or in some cases below this depending on the fatty acid composition used. After the desired temperature has been reached the period of further heating is relatively short and varies with the fatty acid composition used. By varying the proportions of naphthalene resin and oil as well as the softening point of the resin and the kind of oil, a resinous reaction product of predetermined and of widely varying softening points and thermal characteristics is obtained. In general, the resinous reaction product prepared from a naphthalene-aldehyde resin of high melting point and a large proportion of oil has improved temperature susceptibility characteristics over a resinous reaction product of the same melting point as the aforesaid reaction product and prepared from a naphthalene-aldehyde resin of low melting point and a smaller proportion of oil. The softening point of the naphthalene-aldehyde resin employed may be as low as 70° C. or somewhat lower, and as high as 120° C. or somewhat higher, and in this range.

The naphthalene resin used in the reaction is preferably preformed from pure solid naphthalene or from the press cake which is obtained by filtering crystallized naphthalene from a fraction of coal tar obtained by distillation between approximately 180° and 250° C. It has been found satisfactory to use this naphthalene fraction as such, preferably free from phenol.

The formaldehyde employed in the condensation of naphthalene is preferably in the form of aqueous solutions, as for instance, commercial formalin containing from thirty-eight to forty-two per cent by volume of formaldehyde. Paraformaldehyde may also be used, preferably the anhydrous form.

In preparing the naphthalene resin, the naphthalene and aldehyde are reacted preferably in the presence of an acid catalyst, which may be either sulphuric acid or phosphoric acid ($H_3PO_4$). Before reacting the naphthalene-aldehyde resin with a fatty acid composition the acid is preferably completely removed from the latter resin. Also water or moisture is preferably completely removed therefrom.

Drying oils, semi-drying oils, non-drying oils, animal or vegetable oils, fats or waxes either individually or mixtures of two or more thereof may be employed in the reaction with the naphthalene-aldehyde resin. For instance, linseed oil (boiled or raw), tung oil, soybean oil, oiticica oil (oxidized or unoxidized), cotton-seed oil, cocoanut oil, castor oil, menhaden oil, whale oil, oleic acid, stearic acid, and spermaceti are found useful. Of these, the drying oils give highly desirable results and oiticica oil is particularly preferred. Unsaturation in oils tends to increase the speed of reaction with naphthalene resins.

Oil polymers (such as oiticica oil gel or tung oil gel formed by heat or oxidation), "Petrexes" (drying oil-extended alkyd resin prepared by reacting maleic anhydride with a conjugated terpene such as terpinene to give a dibasic acid which in turn is reacted with glycerol and a drying oil), synthetic glyceride-type drying oils, and chlorinated drying oils or other artificially modified oils such as dehydrated castor oil may be reacted with the naphthalene condensation product.

The terms "fatty acid composition" or "fat" as used herein are construed to include the above oil and fat compositions, and fatty acids or their glycerides.

The reaction of the naphthalene resin with a fat may best be carried out in an atmosphere of an inert gas such as carbon dioxide to minimize oxidative effects, but this is not essential.

By way of illustration, a naphthalene resin for use in the present invention may be prepared as follows:

About 12 parts of sulphuric acid (66° Bé.) are gradually added to and stirred into about 12 parts of commercial formalin (40% solution of formaldehyde) while the mixture is being cooled. About 18 parts of naphthalene pressed cake (melting point about 78° C.) are added to the above mixture while being stirred and heated preferably with steam or hot water to approximately 83° C. at which point a reaction between naphthalene and formaldehyde begins. The temperature rises spontaneously and is preferably maintained at about 105° to 110° C. until the polymerized product attains a melting point above about 75° C. After about 2¾ hours the melting point of the resulting resin is about 102° C. If desired, the heating may be continued until the load on the motor used for stirring begins to rise as indicated by ammeter readings. This is generally an indication that all of the naphthalene has reacted and polymerization of the initially formed resin is proceeding.

The resulting mass is then forced through lead lined rolls into cold water whereupon the resin product becomes solid. The water dissolves a substantial portion of the acid remaining in the resin. The acid is more completely removed by grinding the resin until a substantial proportion passes through a 28 mesh screen, and then thoroughly washing the ground material until substantially all of the free acid is removed. Any traces of acid are removed by wetting the resin and agitating it with dilute alkali slightly in excess of the acid equivalent present. The sulphate formed is washed out by further agitation in water whereafter the separated resin is dried by heating until all the water is vaporized.

To illustrate the present invention, the following examples are provided in which the naphthalene aldehyde resin employed is preferably prepared as described above:

Example 1.—About 700 parts of a formaldehyde-naphthalene resin (softening point about 109° C.), preferably freed from acid or salt of the acid and from water, are mixed with about 300 parts of oiticica oil and heated in an atmosphere of carbon dioxide in about 15 minutes to about 280° C. while being stirred. Heating is continued slowly to prevent foaming. At about 310° C. when the mixture is found to be clear by a spot test, the heating is discontinued. The softening point of the resulting resin is 78.5° C.

Example 2.—About 70 parts of a naphthaleneformaldehyde resin (softening point about 118.5° C.) and 30 parts of oiticica oil are heated in an open vessel while being stirred. After a temperature of about 320° C. is reached, stirring is stopped, and the mixture further heated at that temperature for about 5 minutes. At the end of this period the mixture spots clear on a cold surface. The softening point of the resulting resin is about 78° C.

Example 3.—About 83 parts of a naphthaleneformaldehyde resin (softening point about 98° C.) are heated with about 17 parts of linseed oil at a temperature of about 330° C. for about 10 minutes. The resin spots clear at the end of this time and is permitted to cool. The softening point of the resulting resin is about 73° C.

Example 4.—About 83 parts of a naphthaleneformaldehyde resin (softening point about 98.5° C.) are mixed with about 17 parts of cottonseed oil at about 360° to about 370° C. for about 10 minutes. At the end of this period, the resin spots clear on a cold surface. The softening point of the resulting resin is about 60.5° C.

Example 5.—About 80 parts of a naphthaleneformaldehyde resin (softening point about 106° C.) are heated with about 20 parts of tung oil at about 350° to about 360° C. for about 5 minutes at the end of which time the resulting material spots clear on a cold surface.

Example 6.—About 83 parts of naphthaleneformaldehyde resin (softening point about 106° C.) are heated with about 17 parts of oleic acid at about 325° C. for about two or three minutes or until the material spots clear on a cold surface.

Example 7.—About 650 parts of a naphthaleneformaldehyde resin (softening point about 118.5° C.) are heated in an atmosphere of carbon dioxide with about 350 parts of oiticica oil to about 325° C. in about 25 minutes while stirring. The mixture is maintained at the latter temperature for an additional twenty minutes. A clear pill is obtained. The resulting resin has a softening point of about 73.0° C.

Example 8.—About 650 parts of a naphthaleneformaldehyde resin (softening point about 118.5° C.) and about 350 parts of boiled linseed oil are heated together to about 330° C. with stirring in an atmosphere of carbon dioxide in about 25 minutes and then maintained at about 330° to about 340° C. for about 5 minutes. The mixture is cooled to about 295° C. in about 5 minutes, reheated to about 340° C. in about 10 minutes and maintained at about 340° to about 345° C. for about 30 minutes. A clear pill is obtained. The softening point of the resulting resin is about 73° C.

Example 9.—About 430 parts of a naphthaleneformaldehyde resin (softening point about 84° C.), about 48 parts polystyrene, and about 120 parts oiticica oil are heated to about 310° C. and maintained at this temperature for about 10 minutes. The resulting mixture spots clear. The softening point of the resin is about 73° C.

The addition of polystyrene in the last example is found to be advantageous in that it overcomes a certain tendency toward reduction of the softening point of the resin. In other words even though the proportion of fatty acid composition is increased, the polystyrene tends to keep the melting point of the resin up.

*Example 10.*—About 840 parts of a naphthalene-formaldehyde resin (softening point about 88° C.) and about 360 parts of oiticica oil are mixed together and heated to about 300° C. and maintained at this temperature for about 1.7 hours. The resulting clear resin has a melting point of about 67° C. Upon reheating the resin to about 300° C. and maintaining it at this temperature for about ⅓ hour the softening point is raised to about 70° C.

*Example 11.*—About 675 parts of naphthalene-formaldehyde resin (softening point about 104.5° C.) and about 225 parts of oiticica oil are heated in an atmosphere of carbon dioxide to about 300° C. and maintained at this temperature for about 15 minutes. The material spots clear. The softening point of the resulting resin is about 74° C.

*Example 12.*—About 70 parts of naphthalene-formaldehyde resin (softening point about 104.5° C.) and about 30 parts of a chlorinated drying oil are mixed and heated to about 190° C. The mixture spots clear when approximately this temperature is reached. The resulting resin has a softening point of about 76° C.

The resins prepared as described above are highly resistant to the effects of petroleum oils and resistant also to the effects of alkaline materials. To illustrate the improvement in temperature susceptibility the following table is provided. A comparison is made therein between a naphthalene-aldehyde resin and a naphthalene-aldehyde-fat resin of the present invention having similar softening points. Penetrations were obtained with a standard penetrometer.

|  | 77° F. | | | 115° F. | | | Ratio 115° F./77° F. | | |
| --- | --- | --- | --- | --- | --- | --- | --- | --- | --- |
|  | 100 gms. 5 sec. | 200 gms. 5 sec. | 200 gms. 30 sec. | 100 g. 5 sec. | 200 g. 5 sec. | 200 g. 30 sec. | 100 g. 5 sec. | 200 g. 5 sec. | 200 g. 30 sec. |
| Naphthalene-aldehyde-fat | 3.0 | 6.0 | 8.0 | 36 | 56 | 101 | 12.0 | 9.3 | 12.6 |
| Naphthalene-aldehyde | 0.5 | 0.5 | 0.5 | 29 | 56 | 142 | 58.0 | 112.0 | 284 |

It is seen by comparing the ratios of penetrations at 115° and 77° F. for corresponding weights and time periods that the change undergone by the naphthalene-aldehyde-fat resin in passing from the low to the high temperature is considerably less than that undergone by the naphthalene-aldehyde resin.

The proportions of substances referred to in the illustrations are in parts by weight throughout.

What is claimed is:

1. A process of preparing resinous products, which process consists in heating together fatty oil and a preponderating amount of a naphthalene formaldehyde condensation product at temperatures at which they react and above that at which mere dissolution of the condensation product in the fatty oil takes place, until the resulting hot reaction mass spots clear on a cold surface, the said mass on reducing the temperature thereof to room temperature hardening to a resinous product.

2. A process of preparing resinous products, which process consists in heating together fatty drying oil and a preponderating amount of a naphthalene formaldehyde condensation product at temperatures at which they react and above that at which mere dissolution of the condensation product in the fatty drying oil takes place, until the resulting hot reaction mass spots clear on a cold surface, the said mass on reducing the temperature thereof to room temperature hardening to a resinous product.

3. A process of preparing resinous products, which process consists in heating together oiticica oil and a preponderating amount of a naphthalene formaldehyde condensation product at temperatures at which they react and above that at which mere dissolution of the condensation product in the oiticica oil takes place, until the resulting hot reaction mass spots clear on a cold surface, the said mass on reducing the temperature thereof to room temperature hardening to a resinous product.

4. A process of preparing resinous products, which process consists in heating together linseed oil and a preponderating amount of a naphthalene formaldehyde condensation product at temperatures at which they react and above that at which mere dissolution of the condensation product in the linseed oil takes place, until the resulting hot reaction mass spots clear on a cold surface, the said mass on reducing the temperature thereof to room temperature hardening to a resinous product.

5. A process of preparing resinous products, which process consists in heating together tung oil and a preponderating amount of a naphthalene formaldehyde condensation product at temperatures at which they react and above that at which mere dissolution of the condensation product in the tung oil takes place, until the resulting hot reaction mass spots clear on a cold surface, the said mass on reducing the temperature thereof to room temperature hardening to a resinous product.

6. A composition of matter comprising the resin product, that is a hardened material at room temperature, formed on cooling a reaction mass formed by heating together fatty oil and a preponderating amount of a naphthalene formaldehyde resin at temperatures at which they react and above that at which mere dissolution of the naphthalene formaldehyde resin in the fatty oil occurs, until the reaction mass spots clear on a cold surface.

7. A composition of matter comprising the resin product, that is a hardened material at room temperature, formed on cooling a reaction mass formed by heating together fatty drying oil and a preponderating amount of a naphthalene formaldehyde resin at temperatures at which they react and above that at which mere dissolution of the naphthalene formaldehyde resin in the fatty drying oil occurs, until the reaction mass spots clear on a cold surface.

8. A composition of matter comprising the resin product, that is a hardened material at room temperature, formed on cooling a reaction mass formed by heating together oiticica oil and a preponderating amount of a naphthalene formaldehyde resin at temperatures at which they react and above that at which mere dissolution of the naphthalene formaldehyde resin in the oiticica oil occurs, until the reaction mass spots clear on a cold surface.

9. A composition of matter comprising the resin product, that is a hardened material at room temperature, formed on cooling a reaction mass formed by heating together linseed oil and a preponderating amount of a naphthalene formaldehyde resin at temperatures at which they react and above that at which mere dissolution of the naphthalene formaldehyde resin in the linseed oil occurs, until the reaction mass spots clear on a cold surface.

10. A composition of matter comprising the resin product, that is a hardened material at room temerature, formed on cooling a reaction mass formed by heating together tung oil and a preponderating amount of a naphthalene formaldehyde resin at temperatures at which they react and above that at which mere dissolution of the naphthalene formaldehyde resin in the tung oil occurs, until the reaction mass spots clear on a cold surface.

11. A composition of matter comprising a resin obtained by heating and reacting a naphthalene formaldehyde condensation product with a fatty oil in the presence of polystyrene.

12. A process of preparing resinous products, which process comprises heating together in the presence of polystyrene a fatty oil and a naphthalene formaldehyde condensation product to react the fatty oil with the said condensation product to form a resin.

ERNEST B. KESTER.